US010974383B2

(12) United States Patent
Hu et al.

(10) Patent No.: US 10,974,383 B2
(45) Date of Patent: Apr. 13, 2021

(54) METHOD AND APPARATUS FOR ABNORMALITY DETECTION (71) Applicant: Siemens Aktiengesellschaft, Munich (DE)

(72) Inventors: Tao Hu, Beijing (CN); Li Ming Huang, Beijing (CN); Yue Zhuo, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 277 days.

(21) Appl. No.: 15/771,207

(22) PCT Filed: Oct. 28, 2015

(86) PCT No.: PCT/CN2015/093137
§ 371 (c)(1),
(2) Date: Apr. 26, 2018

(87) PCT Pub. No.: WO2017/070872
PCT Pub. Date: May 4, 2017

(65) Prior Publication Data
US 2018/0314244 A1    Nov. 1, 2018

(51) Int. Cl.
*B25J 9/16* (2006.01)
*G05B 19/048* (2006.01)
*G05B 23/02* (2006.01)

(52) U.S. Cl.
CPC .......... *B25J 9/1623* (2013.01); *B25J 9/1674* (2013.01); *G05B 19/048* (2013.01);
(Continued)

(58) Field of Classification Search
CPC ...... G05B 23/0245; G05B 2219/49278; G05B 2219/40235; B25J 9/1623; B25J 9/1674
See application file for complete search history.

(56) References Cited

U.S. PATENT DOCUMENTS 5,834,916 A * 11/1998 Shimogama ......... G05B 19/231
318/568.13
2004/0260481 A1* 12/2004 Heiligensetzer ....... B25J 9/1674
702/33
(Continued)

FOREIGN PATENT DOCUMENTS

| CN | 102431036 A | 5/2012 |
| CN | 103604591 A | 2/2014 |
| EP | 2082851 A1 | 7/2009 |

OTHER PUBLICATIONS

PCT International Search Report and Written Opinion of International Search Authority dated Jul. 29, 2016 corresponding to PCT International Application No. PCT/CN2015/093137 filed Oct. 28, 2015.
(Continued)

*Primary Examiner* — Michael J Dalbo
(74) *Attorney, Agent, or Firm* — Harness, Dickey & Pierce, P.L.C.

(57) ABSTRACT

A method and apparatus are for abnormality detection. The method includes: acquiring an estimated value of a movement parameter of a mobile platform of a parallel robot. The estimated value is calculated based on sensing information about a sensor mounted on the mobile platform. Based on the estimated value and a designated value of the movement parameter, the method includes determining whether an abnormality occurs in the parallel robot. By way of the method and apparatus, abnormality of a parallel robot can be detected reliably.

12 Claims, 6 Drawing Sheets (52) U.S. Cl.
CPC ............... *G05B 23/0245* (2013.01); *G05B 2219/40235* (2013.01); *G05B 2219/49278* (2013.01)

(56) References Cited

U.S. PATENT DOCUMENTS

| | | |
|---|---|---|
| 2008/0091383 A1 | 4/2008 | Ueno et al. |
| 2008/0140258 A1 | 6/2008 | Ueno et al. |
| 2009/0088898 A1* | 4/2009 | Nihei .................. B25J 5/02 700/253 |
| 2013/0060381 A1 | 3/2013 | Nakanishi |
| 2015/0241203 A1* | 8/2015 | Jordil .................. B25J 9/1623 356/4.01 |
| 2017/0325647 A1* | 11/2017 | Kwak .................. G05D 1/0088 |

OTHER PUBLICATIONS

Extended European Search Report dated Aug. 12, 2019.

* cited by examiner

METHOD AND APPARATUS FOR ABNORMALITY DETECTION

PRIORITY STATEMENT

This application is the national phase under 35 U.S.C. § 371 of PCT International Application No. PCT/CN2015/093137 which has an International filing date of Oct. 28, 2015, which designated the United States of America, the entire contents of which are hereby incorporated herein by reference.

FIELD

An embodiment of the invention generally relates to the field of robots, and in particular generally relates to a method and/or apparatus for abnormality detection.

BACKGROUND ART

A parallel robot is a closed-loop mechanism driven in parallel, comprises a mobile platform and a static platform which are connected through at least two independent kinematic chains, and has two or more degrees of freedom. A Delta robot is a typical parallel robot. Delta robots have popular usage in picking and packaging in the manufacturing industry because they are fast and have high dynamic flexibility, structural rigidity, positioning accuracy, and repeatability.

Abnormalities, for example, mechanical failure or loss of accuracy, may occur to parallel robots because of the influence of heat effect and component deformation after they work for a long period of time. Abnormalities of parallel robots will damage the products being picked, shorten the service life of parallel robots, or even put the operators in danger.

The operators usually inspect with naked eyes whether abnormalities occur to parallel robots. However, it is not reliable for the operators to inspect with naked eyes whether abnormalities occur to parallel robots, and especially it is difficult for the operators to observe abnormalities when the loss of the operation accuracy of parallel robots is insignificant.

SUMMARY

In consideration of the above-mentioned problems of the prior art, the embodiments of the present invention provide a method and apparatus for abnormality detection, and the method and apparatus can be used to reliably detect abnormalities of parallel robots.

A method for abnormality detection in the embodiments of the present invention comprises:

acquiring an estimated value of a movement parameter of the mobile platform of a parallel robot, wherein the estimated value is calculated based on the information sensed by a sensor mounted on the mobile platform; and determining whether an abnormality occurs to the parallel robot based on the estimated value and a designated value of the movement parameter.

An apparatus for abnormality detection in the embodiments of the present invention comprises:

an acquisition module used to acquire an estimated value of a movement parameter of a mobile platform of a parallel robot, wherein the estimated value is calculated based on the information sensed by a sensor mounted on the mobile platform; and a determination module used to determine whether an abnormality occurs to the parallel robot based on the estimated value and a designated value of the movement parameter.

A machine readable medium in the embodiments of the present invention stores executable instructions, and when the executable instructions are executed, the machine executes the operations involved in an embodiment of the method.

A system for abnormality detection in the embodiments of the present invention comprises a sensor mounted on a mobile platform of a parallel robot, and control equipment used to determine whether an abnormality occurs to the parallel robot based on an estimated value of a movement parameter of the mobile platform and a designated value of the movement parameter, wherein the estimated value is calculated based on the information sensed by the sensor.

A parallel robot in the embodiments of the present invention comprises a static platform, a mobile platform, and an embodiment of the above-mentioned system for abnormality detection.

BRIEF DESCRIPTION OF THE DRAWINGS

The following detailed description in combination with the drawing will make other characteristics and advantages of the present invention more obvious.

DETAILED DESCRIPTION OF THE EXAMPLE EMBODIMENTS

A method for abnormality detection in the embodiments of the present invention comprises: acquiring an estimated value of a movement parameter of the mobile platform of a parallel robot, wherein the estimated value is calculated based on the information sensed by a sensor mounted on the mobile platform, and determining whether an abnormality occurs to the parallel robot based on the estimated value and a designated value of the movement parameter.

The designated value includes the maximum and minimum of the movement parameter, and the determination step comprises confirming that an abnormality occurs to the parallel robot if the estimated value is not between the maximum and the minimum.

The designated value includes a target value of the movement parameter, and the determination step comprises confirming that an abnormality occurs to the parallel robot if the difference between the estimated value and the target value is greater than a designated threshold.

The acquisition step comprises receiving the sensed information from the sensor and calculating the estimated value based on the received sensed information.

The method further comprises executing the corresponding abnormality processing when it is confirmed that an abnormality occurs to the parallel robot.

An apparatus for abnormality detection in the embodiments of the present invention comprises: an acquisition module used to acquire an estimated value of a movement parameter of a mobile platform of a parallel robot, wherein the estimated value is calculated based on the information sensed by a sensor mounted on the mobile platform, and a determination module used to determine whether an abnormality occurs to the parallel robot based on the estimated value and a designated value of the movement parameter.

The designated value includes the maximum and minimum of the movement parameter, and the determination module is further used to confirm that an abnormality occurs to the parallel robot if the estimated value is not between the maximum and the minimum.

The designated value includes a target value of the movement parameter, and the determination module is further used to confirm that an abnormality occurs to the parallel robot if the difference between the estimated value and the target value is greater than a designated threshold.

The acquisition module comprises a receiving module used to receive the sensed information, and a calculation module used to calculate the estimated value based on the received sensed information.

The apparatus further comprises an execution module used to execute the corresponding abnormality processing when it is confirmed that an abnormality occurs to the parallel robot.

A piece of equipment for abnormality detection in the embodiments of the present invention comprises a storage and a processor coupled with the storage and used to execute the operations involved in the previous method.

A machine readable medium in the embodiments of the present invention stores executable instructions, and when the executable instructions are executed, the machine executes the operations involved in an embodiment of the method.

A system for abnormality detection in the embodiments of the present invention comprises a sensor mounted on a mobile platform of a parallel robot, and control equipment used to determine whether an abnormality occurs to the parallel robot based on an estimated value of a movement parameter of the mobile platform and a designated value of the movement parameter, wherein the estimated value is calculated based on the information sensed by the sensor.

The system further comprises a general processor used to calculate the estimated value according to the sensed information of the sensor.

The designated value includes the maximum and minimum of the movement parameter, and the control equipment confirms that an abnormality occurs to the parallel robot if the estimated value is not between the maximum and the minimum.

The designated value includes a target value of the movement parameter, and the control equipment confirms that an abnormality occurs to the parallel robot if the difference between the estimated value and the target value is greater than a designated threshold.

The control equipment is further used to receive the sensed information from the sensor and calculate the estimated value based on the received sensed information.

The control equipment is further used to execute the corresponding abnormality processing when it is confirmed that an abnormality occurs to the parallel robot.

The movement parameter comprises one or more of the position of the mobile platform, the linear velocity of the mobile platform, the linear acceleration of the mobile platform, the angular acceleration of the mobile platform, and the direction of the mobile platform.

The sensor comprises an accelerometer, a gyroscope, and/or a magnetometer.

A parallel robot in the embodiments of the present invention comprises a static platform, a mobile platform, and an embodiment of the above-mentioned system for abnormality detection.

From the description above, it can be seen that since the embodiments of the present invention utilize the mobile platform's movement parameter which can prompt an abnormality of the parallel robot, the embodiments of the present invention can reliably detect the abnormality of the parallel robot, compared with the prior art.

After many experiments, the inventors find that the value of a movement parameter of a mobile platform of a parallel robot in an abnormal state is different from the value of the movement parameter of the mobile platform of the parallel robot in a normal state, that is to say, a movement parameter of the mobile platform of the parallel robot can prompt an abnormality of the parallel robot. Based on this finding, the movement parameters of the mobile platform of the parallel robot are utilized to detect whether any abnormality occurs to the parallel robot in the present invention.

The following will describe in detail the embodiments of the present invention by reference to the drawings. For the convenience of explanation, a lot of specific details are given in the description below so as to provide a comprehensive understanding of one or more embodiments. However, it is very obvious that the embodiments can be realized otherwise, without these details. In other examples, common structures and equipment are shown in block diagrams so that one or more embodiments can be described conveniently.

Figure 1:
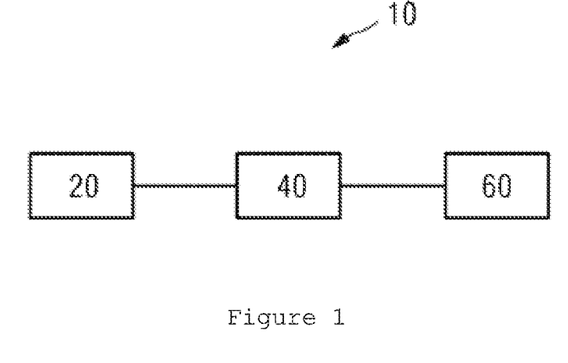
FIG. 1 is a schematic diagram for a Delta robot in one embodiment of the present invention.

Now see FIG. 1, which is a schematic diagram for a Delta robot in one embodiment of the present invention. As shown in FIG. 1, the Delta robot (10) comprises a static platform (20), a mobile platform (40), and a system (60) for abnormality detection (hereinafter referred to as abnormality detection system). The abnormality detection system (60) utilizes a movement parameter of the mobile platform (40) to detect any abnormality of the Delta robot (10).

Figure 2:
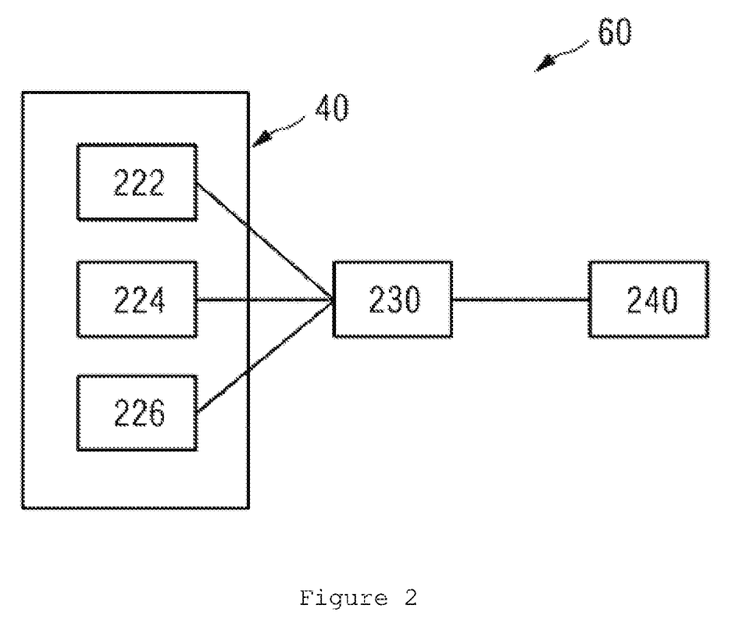
FIG. 2 is a schematic diagram for the architecture of the system for abnormality detection in one embodiment of the present invention.

Now see FIG. 2, which is a schematic diagram for the architecture of the abnormality detection system in one embodiment of the present invention.

As shown in FIG. 2, the abnormality detection system (60) comprises three sensors, namely, an accelerometer (222), a gyroscope (224), and a magnetometer (226). In addition, the abnormality detection system (60) further comprises a general processor (230) and control equipment (240).

The accelerometer (222), the gyroscope (224), and the magnetometer (226) are mounted in proper places on the mobile platform (40) of a Delta robot (10). For example, the gyroscope (224) is mounted on the end effector on the mobile platform (40). The accelerometer (222) is used to sense the linear velocity of the mobile platform (40), the gyroscope (224) is used to sense the angular acceleration of the mobile platform (40), and the magnetometer (226) is used to sense the direction of the mobile platform (40). The accelerometer (222), the gyroscope (224), and the magnetometer (226) can be separated or can be integrated (for example, LSM9DS1 sensor supplied by STMicroelectronics).

The general processor (230) can be, but is not limited to, for example, an ARM processor produced by ARM, a digital signal processor (DSP), a PowerPC processor, or a field programmable gate array (FPGA). The general processor (230) is connected to the accelerometer (222), the gyroscope (224), and the magnetometer (226) with an inter-integrated circuit (IIC) bus or in other communication modes so as to receive sensed information from the accelerometer (222), the gyroscope (224), and the gyroscope (226) and calculate the estimated value of a movement parameter of the mobile platform (40) of the Delta robot (10) based on the received sensed information. Here, the movement parameters of the mobile platform (40) comprise the position of the mobile platform (40), the linear velocity of the mobile platform (40), the linear acceleration of the mobile platform (40), the angular acceleration of the mobile platform (40), and the direction of the mobile platform (40).

The control equipment (240) can be connected to the general processor (230) and the Delta robot (10) with a field bus (for example, CAN), for example, or in other communication modes. The control equipment (240) obtains the estimated value of a movement parameter of the mobile platform (40) of the Delta robot (10) from the general processor (230), determines whether an abnormality occurs to the Delta robot (10) based on the obtained estimated value, and the target value, the maximum, and the minimum of a movement parameter of the mobile platform (40), and executes the corresponding abnormality processing when it is confirmed that an abnormality occurs to the Delta robot (10). The target value of a movement parameter of the mobile platform (40) is obtained from the Delta robot (10). Here, abnormality processing includes but is not limited to giving out an alarm sound, displaying alarm information on a display screen or by use of a beacon, sending an alarm message to the remote controller, powering off the Delta robot (10), and/or printing the messages indicating errors by use of a printer.

Figure 3:
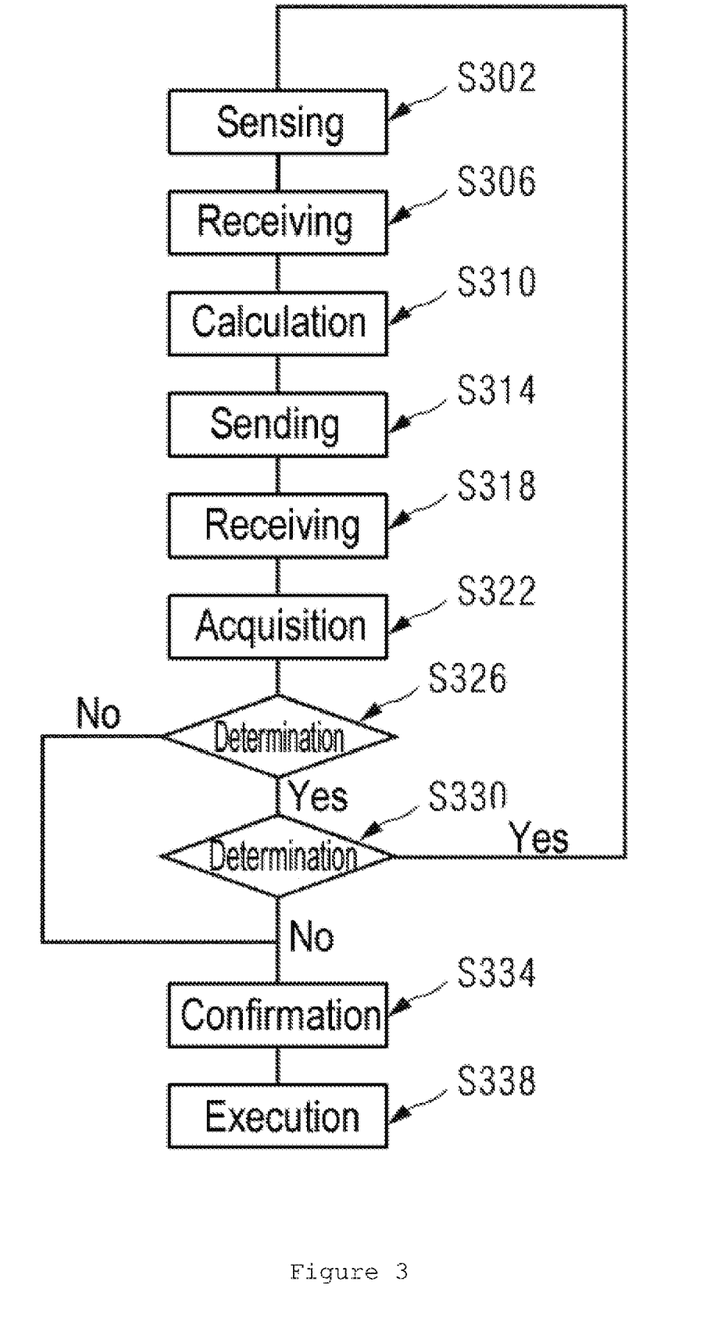
FIG. 3 is a flowchart of the method for abnormality detection in one embodiment of the present invention.

Now see FIG. 3, which is a flowchart of the method for abnormality detection in one embodiment of the present invention. The following describes the method in combination with FIG. 1 and FIG. 2. In addition, for simplicity, the method is shown and is depicted as a series of operations, but it should be understood that the method is not restricted by the sequence of the operations because some operations can happen in different sequences and/or can simultaneously happen together with other operations shown and described in the present application according to one or more embodiments of the present invention.

As shown in FIG. 3, in step S302, the accelerometer (222), the gyroscope (224), and the magnetometer (226) sense information and output the corresponding sensed information. The sensed information output by the accelerometer (222) is the linear acceleration of the mobile platform (40) of the Delta robot (10), the sensed information output by the gyroscope (224) is the angular acceleration of the mobile platform (40), and the sensed information output by the magnetometer (226) is the direction of the mobile platform (40), wherein the direction is a vector.

In step S306, the general processor (230) receives the sensed information output by the accelerometer (222), the gyroscope (224), and the magnetometer (226).

In step S310, the general processor (230) calculates the estimated value of a movement parameter of the mobile platform (40) based on the received sensed information. Specifically, the general processor (230) calculates the linear acceleration of the mobile platform (40) according to the sensed information received from the accelerometer (222), the general processor (230) integrates the linear acceleration of the mobile platform (40) to obtain the linear velocity of the mobile platform (40), the general processor (230) integrates the linear velocity of the mobile platform (40) to obtain the position of the mobile platform (40), the general processor (230) calculates the angular acceleration of the mobile platform (40) according to the sensed information received from the gyroscope (224), and the general processor (230) calculates the direction of the mobile platform (40) according to the sensed information received from the magnetometer (226).

In step S314, the general processor (230) sends the calculated estimated value of a movement parameter of the mobile platform (40) to the control equipment (240).

In step S318, the control equipment (240) receives the estimated value of a movement parameter of the mobile platform (40) from the general processor (230).

In step S322, the control equipment (240) acquires the target value of a movement parameter of the mobile platform (40) from the Delta robot (10), wherein the target value is the value which the Delta robot (10) expects to achieve through operations.

In step S326, the control equipment (240) determines whether the received estimated value of a movement parameter of the mobile platform (40) is between the maximum and the minimum of a movement parameter of the mobile platform (40) (that is to say, whether the received estimated value is smaller than the maximum of a movement parameter of the mobile platform (40) but is greater than the minimum of a movement parameter of the mobile platform (40)), wherein the maximum and the minimum of a movement parameter of the mobile platform (40) are pre-stored in the control equipment (240).

Specifically, the determinations made by the control equipment (240) are as follows: determining whether the received estimated value of the position of the mobile platform (40) is between the maximum and the minimum of the position of the mobile platform (40), determining whether the received estimated value of the linear velocity of the mobile platform (40) is between the maximum and the minimum of the linear velocity of the mobile platform (40), determining whether the received estimated value of the linear acceleration of the mobile platform (40) is between the maximum and the minimum of the linear acceleration of the mobile platform (40), determining whether the received estimated value of the angular acceleration of the mobile platform (40) is between the maximum and the minimum of the angular acceleration of the mobile platform (40), and determining whether the received estimated value of the direction of the mobile platform (40) is between the maximum and the minimum of the direction of the mobile platform (40).

If the determination result in step S326 is No, that is to say, the estimated value of any of the position, velocity, acceleration, angular acceleration, and direction of the mobile platform (40) is not between the maximum and the minimum, the process goes to step S334.

If the determination result in step S326 is Yes, that is to say, the estimated value of each of the position velocity, acceleration, angular acceleration, and direction of the mobile platform (40) is between the maximum and the minimum, the control equipment (240) further determines whether the difference between the received estimated value of a movement parameter of the mobile platform (40) and the target value of the mobile platform (40) is smaller than the designated threshold in step S330.

Specifically, the determinations made by the control equipment (240) are as follows: determining whether the difference between the received estimated value of the position of the mobile platform (40) and the target value of the position of the mobile platform (40) is smaller than a first designated threshold, determining whether the difference between the received estimated value of the linear velocity of the mobile platform (40) and the target value of the linear velocity of the mobile platform (40) is smaller than a second designated threshold, determining whether the difference between the received estimated value of the linear acceleration of the mobile platform (40) and the target value of the linear acceleration of the mobile platform (40) is smaller than a third designated threshold, determining whether the difference of the received estimated value of the angular acceleration of the mobile platform (40) and the target value of the angular acceleration of the mobile platform (40) is smaller than a fourth designated threshold, and determining whether the difference between the received estimated value of the direction of the mobile platform (40) and the target value of the direction of the mobile platform (40) is smaller than a fifth designated threshold.

If the determination result in step S330 is Yes, that is to say, the difference between the estimated value of each of the position, linear velocity, linear acceleration, angular acceleration, and direction of the mobile platform (40) and the target value is smaller than the corresponding designated threshold, the process goes back to step S302.

If the determination result in step S330 is No, that is to say, the difference between the estimated value of each of the position, linear velocity, linear acceleration, angular acceleration, and direction of the mobile platform (40) and the target value is greater than the corresponding designated threshold, the process goes to step S334.

In step S334, the control equipment (240) confirms that an abnormality occurs to the Delta robot (10).

In step S338, the control equipment (240) executes the corresponding abnormality processing. Here, abnormality processing includes but is not limited to giving out an alarm sound, displaying alarm information on a display screen or by use of a beacon, sending an alarm message to the remote controller, powering off the Delta robot (10), and/or printing the messages indicating errors by use of a printer.

From the description above, it can be seen that since the solutions in the embodiments of the present invention utilize a movement parameter of the mobile platform (40) of the Delta robot (10) to indicate any abnormality of the Delta robot (10), the solutions in the embodiments of the present invention can reliably detect the abnormality of the Delta robot (10).

Other Variants

Those skilled in the art should understand that in the embodiments above, when determining whether an abnormality occurs to the Delta robot (10), the control equipment first makes a first determination whether the estimated value of a movement parameter of the mobile platform (40) is between the maximum and the minimum of the movement parameter of the mobile platform (40), and then makes a second determination whether the difference between the estimated value of a movement parameter of the mobile platform (40) and the target value is smaller than the designated value, but the present invention is not limited to this determination sequence.

In some other embodiments of the present invention, when determining whether an abnormality occurs to the Delta robot (10), the control equipment can first make the second determination whether the difference between the estimated value of a movement parameter of the mobile platform (40) and the target value is smaller than the designated value, and can then make the first determination whether the estimated value of a movement parameter of the mobile platform (40) is between the maximum and the minimum of a movement parameter of the mobile platform (40).

Those skilled in the art should understand that in the embodiments above, when determining whether an abnormality occurs to the Delta robot (10), the control equipment needs to make a first determination whether the estimated value of a movement parameter of the mobile platform (40) is between the maximum and the minimum of a movement parameter of the mobile platform (40), and a second determination whether the difference between the estimated value of a movement parameter of the mobile platform (40) and the target value is smaller than the designated value, but the present invention is not limited to these determinations. In some other embodiments of the present invention, when determining whether an abnormality occurs to the Delta robot (10), the control equipment can make only the first determination whether the estimated value of a movement parameter of the mobile platform (40) is between the maximum and the minimum of a movement parameter of the mobile platform (40), or can make only the second determination whether the difference between the estimated value of a movement parameter of the mobile platform (40) and the target value is smaller than the designated value.

Those skilled in the art should understand that in the embodiments above, the abnormality detection system (60) comprises the general processor (230), which calculates the estimated value of a movement parameter of the mobile platform (40) according to the sensed information of the accelerometer (222), the gyroscope (224), and the magnetometer (226), but the present invention is not limited to the general processor. In some other embodiments of the present invention, the abnormality detection system (60) comprises no general processor (230) and control equipment (240) calculates the estimated value of a movement parameter of the mobile platform (40) according to the sensed information of the accelerometer (222), the gyroscope (224), and the magnetometer (226).

Those skilled in the art should understand that in the embodiments above, the abnormality detection system (60) comprises three different types of sensors, namely, accelerometer (222), gyroscope (224), and magnetometer (226), but the present invention is not limited to these types of sensors. In some other embodiments of the present invention, the abnormality detection system (60) can comprise only one or two of the accelerometer (222), the gyroscope (224), and the magnetometer (226). Alternatively, the abnormality detection system (60) can comprise other types of sensors.

Those skilled in the art should understand that in the embodiments above, the position of the mobile platform (40), the linear acceleration of the mobile platform (40), the linear velocity of the mobile platform (40), the angular acceleration of the mobile platform (40), and the direction of the mobile platform (40) are used as movement parameters of the mobile platform (40), but the present invention is not limited to these parameters. In some other embodiments of the present invention, only some of the position of the mobile platform (40), the linear acceleration of the mobile platform (40), the linear velocity of the mobile platform (40), the angular acceleration of the mobile platform (40), and the direction of the mobile platform (40) are used as movement parameters of the mobile platform (40). Alternatively, the movement parameters of the mobile platform can further include other parameters which can reflect movement characteristics of the mobile platform (40).

Those skilled in the art should understand that the solutions disclosed here are not only applicable to Delta robots, but also are applicable to other types of parallel robots.

Figure 4:
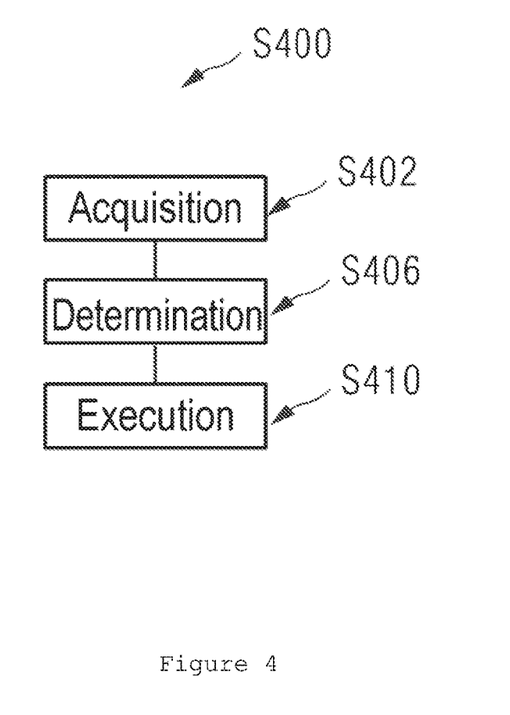
FIG. 4 is a flowchart of the method for abnormality detection in another embodiment of the present invention.

Now see FIG. 4, which is a flowchart of the method for abnormality detection in another embodiment of the present invention. The method (400) shown in FIG. 4 can be executed by the control equipment (240), for example.

As shown in FIG. 4, in step S402, the acquisition module acquires an estimated value of a movement parameter of the mobile platform of the parallel robot, wherein the estimated value is calculated based on the information sensed by a sensor mounted on the mobile platform.

In step S406, the determination module determines whether an abnormality occurs to the parallel robot based on the estimated value and a designated value of the movement parameter.

In one specific implementation mode, the designated value includes the maximum and minimum of the movement parameter, and determination step S406 comprises confirming that an abnormality occurs to the parallel robot if the estimated value is not between the maximum and the minimum.

In one specific implementation mode, the designated value includes a target value of the movement parameter, and determination step S406 comprises confirming that an abnormality occurs to the parallel robot if the difference between the estimated value and the target value is greater than a designated threshold.

In one specific implementation mode, acquisition step S402 comprises receiving the sensed information from the sensor and calculating the estimated value based on the received sensed information.

In one specific implementation mode, acquisition step S402 comprises acquiring the estimated value from the general processor (230).

In one specific implementation mode, the method (400) further comprises step S410 of executing the corresponding abnormality processing when it is confirmed that an abnormality occurs to the parallel robot.

In one specific implementation mode, the movement parameter comprises one or more of the position of the mobile platform, the linear velocity of the mobile platform, the linear acceleration of the mobile platform, the angular acceleration of the mobile platform, and the direction of the mobile platform.

In one specific implementation mode, the sensor comprises an accelerometer, a gyroscope, and/or a magnetometer.

Figure 5:
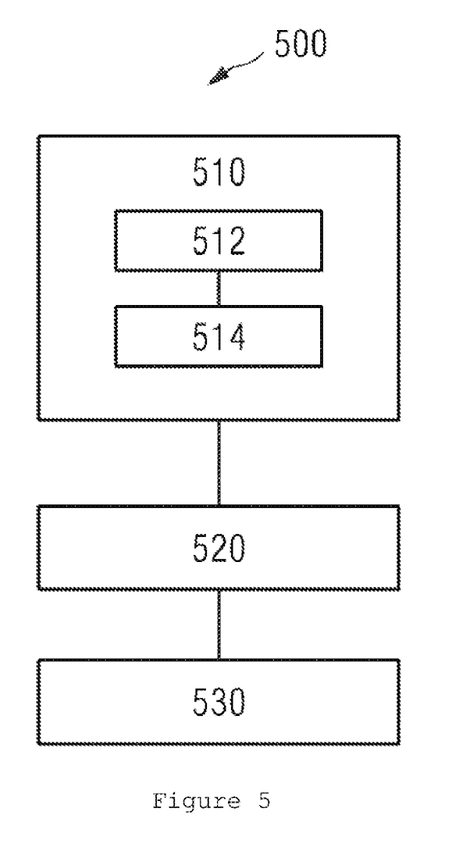
FIG. 5 is a schematic diagram for the apparatus for abnormality detection in one embodiment of the present invention.

Now see FIG. 5, which is a schematic diagram for the apparatus for abnormality detection in one embodiment of the present invention. The apparatus shown in FIG. 5 can be realized by use of software, hardware, or the combination of software and hardware, and can be mounted on the control equipment (240), for example.

As shown in FIG. 5, the apparatus (500) for abnormality detection can comprise an acquisition module (510) and a determination module (520). The acquisition module (510) is used to acquire an estimated value of a movement parameter of the mobile platform of a parallel robot, wherein the estimated value is calculated based on the information sensed by a sensor mounted on the mobile platform. The determination module (520) is used to determine whether an abnormality occurs to the parallel robot based on the estimated value and a designated value of the movement parameter.

In one specific implementation mode, the designated value includes the maximum and minimum of the movement parameter, and the determination module (520) is further used to confirm that an abnormality occurs to the parallel robot if the estimated value is not between the maximum and the minimum.

In one specific implementation mode, the designated value includes a target value of the movement parameter, and the determination module (520) is further used to confirm that an abnormality occurs to the parallel robot if the difference between the estimated value and the target value is greater than a designated threshold.

In one specific implementation mode, the acquisition module (510) comprises a receiving module (512) used to receive the sensed information, and a calculation module (514) used to calculate the estimated value based on the received sensed information.

In one specific implementation mode, the acquisition step (510) is further used to acquire the estimated value from the general processor (230).

In one specific implementation mode, the apparatus (500) further comprises an execution module (530) used to execute the corresponding abnormality processing when it is confirmed that an abnormality occurs to the parallel robot.

In one specific implementation mode, the movement parameter comprises one or more of the position of the mobile platform, the linear velocity of the mobile platform, the linear acceleration of the mobile platform, the angular acceleration of the mobile platform, and the direction of the mobile platform.

In one specific implementation mode, the sensor comprises an accelerometer, a gyroscope, and/or a magnetometer.

Figure 6:
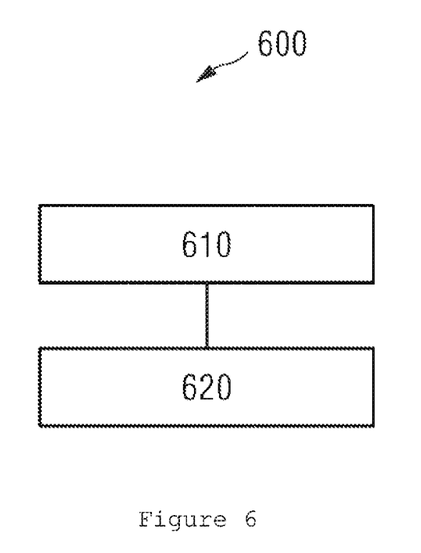
FIG. 6 is a schematic diagram for the equipment for abnormality detection in one embodiment of the present invention.

Now see FIG. 6, which is a schematic diagram for the equipment for abnormality detection in one embodiment of the present invention. The equipment (600) shown in FIG. 6 can be control equipment (240).

As shown in FIG. 6, equipment (600) can comprise a storage (610) used to store executable instructions and a processor (620) connected with the storage (610), wherein the processor (620) is used to execute the operations executed in the steps of the method (400) shown in FIG. 4.

An embodiment of the present invention further provides a machine readable medium, which stores executable instructions, wherein when the executable instructions are executed, the machine executes the operations executed in the steps of the method (400) shown in FIG. 4.

Those skilled in the art should understand that variants and modifications can be made without departing from the essence of the present invention. Therefore, the scope of protection of the present invention should be defined by the attached claims.

The invention claimed is:

1. A method for abnormality detection, comprising:
receiving information sensed by a sensor mounted on a mobile platform of a parallel robot;
calculating an estimated value of a movement parameter of the mobile platform of the parallel robot based on the information sensed by the sensor; and
determining whether an abnormality occurs to the parallel robot based on the estimated value acquired, a designated threshold, and a designated value of the movement parameter, wherein the designated value includes a target value, a maximum of the movement parameter, and a minimum of the movement parameter, the maximum of the movement parameter and the minimum of the movement parameter are pre-stored, and the determining includes confirming that the abnormality occurs to the parallel robot upon
the estimated value acquired not being between the maximum of the movement parameter and the minimum of the movement parameter, and
a difference between the estimated value acquired and the target value being greater than the designated threshold.

2. The method as claimed in claim 1, further comprising:
executing abnormality processing based on the determining indicating that the abnormality occurs to the parallel robot.

3. A machine readable medium, storing executable instructions, wherein when the executable instructions are executed by a machine, the machine is configured to execute the method of claim 1.

4. A machine readable medium, storing executable instructions, wherein when the executable instructions are executed by a machine, the machine is configured to execute the method of claim 1.

5. An apparatus for abnormality detection, comprising:
memory storing computer-readable instructions; and
one or more processors configured to execute the computer-readable instructions to cause the apparatus to:
receive information sensed by a sensor mounted on a mobile platform of a parallel robot;
calculate an estimated value of a movement parameter of the mobile platform of the parallel robot based on the information sensed by the sensor; and
determine whether an abnormality occurs to the parallel robot based on the estimated value acquired, a designated threshold, and a designated value of the movement parameter, wherein the designated value includes a target value, a maximum of the movement parameter, and a minimum of the movement parameter, the maximum of the movement parameter and the minimum of the movement parameter are pre-stored, and the determining includes confirming that the abnormality occurs to the parallel robot upon
the estimated value acquired not being between the maximum of the movement parameter and the minimum of the movement parameter, and
a difference between the estimated value acquired and the target value being greater than the designated threshold.

6. The apparatus as claimed in claim 5, the one or more processors are further configured to cause the apparatus to:
execute the abnormality processing upon the one or more processors confirming that the abnormality occurs to the parallel robot.

7. A piece of equipment for abnormality detection, comprising:
a storage, and
a processor, coupled with the storage, to
receive information sensed by a sensor mounted on a mobile platform of a parallel robot
calculate an estimated value of a movement parameter of the mobile platform of the parallel robot based on the information sensed by the sensor; and
determine whether an abnormality occurs to the parallel robot based on the estimated value, a designated threshold, and a designated value of the movement parameter, wherein the designated value includes a target value, a maximum of the movement parameter, and a minimum of the movement parameter, the maximum of the movement parameter and the minimum of the movement parameter are pre-stored, and the determining includes confirming that the abnormality occurs to the parallel robot upon
the estimated value acquired not being between the maximum of the movement parameter and the minimum of the movement parameter, and
a difference between the estimated value acquired and the target value being greater than the designated threshold.

8. A system for abnormality detection, comprising:
a sensor mounted on a mobile platform of a parallel robot, and
control equipment configured to
receive information sensed by the sensor,
calculate an estimated value of a movement parameter of the mobile platform of the parallel robot based on the information sensed by the sensor, and
determine whether an abnormality occurs to the parallel robot based on the estimated value, a designated threshold, and a designated value of the movement parameter, wherein the designated value includes a target value, a maximum of the movement parameter, and a minimum of the movement parameter, the maximum of the movement parameter and the minimum of the movement parameter are pre-stored, and the determining includes confirming that the abnormality occurs to the parallel robot upon
the estimated value acquired not being between the maximum of the movement parameter and the minimum of the movement parameter, and
a difference between the estimated value acquired and the target value being greater than the designated threshold.

9. The system as claimed in claim 8, wherein the movement parameter comprises one or more of a position of the mobile platform, a linear velocity of the mobile platform, a linear acceleration of the mobile platform, an angular acceleration of the mobile platform, and a direction of the mobile platform.

10. A parallel robot, comprising
a static platform,
a mobile platform, and
the system of claim 9.

11. The system as claimed in claim 8, wherein the sensor includes at least one of an accelerometer, a gyroscope, and a magnetometer.

12. A parallel robot, comprising
a static platform,
a mobile platform, and
the system of claim 8.

* * * * *